United States Patent [19]

Ronco et al.

[11] 4,441,605
[45] Apr. 10, 1984

[54] TWO-PIECE SNAP-ON FLIGHT FOR A CONVEYOR CHAIN

[75] Inventors: Kenneth J. Ronco, Brookfield; Robert E. Stacey, Waukesha, both of Wis.

[73] Assignee: Rexnord Inc., Milwaukee, Wis.

[21] Appl. No.: 297,378

[22] Filed: Aug. 28, 1981

[51] Int. Cl.³ .............................................. B65G 19/24
[52] U.S. Cl. ..................................... 198/731; 198/719; 198/733
[58] Field of Search ............... 198/731, 648, 716, 719, 198/733, 734

[56] References Cited

U.S. PATENT DOCUMENTS 2,544,191  3/1951  Tomfohrde .......................... 198/734
2,756,867  7/1956  Russell et al. ........................ 198/731
3,442,368  5/1969  Heifetz ................................ 198/733

FOREIGN PATENT DOCUMENTS 1242011  8/1971  United Kingdom ................ 198/731

OTHER PUBLICATIONS

"Kleen Flo Drag Conveyor" by Huss & Schlieper Inc.

Primary Examiner—Robert J. Spar
Assistant Examiner—Jonathan D. Holmes
Attorney, Agent, or Firm—Theresa F. Camoriano; Vance A. Smith

[57] ABSTRACT

A flight for a chain which has sidebars, comprising a side portion adapted to lie against the outer surface of one sidebar of a chain link. A lip is attached to one end of the side portion and includes a lip portion adapted to contact the inner surface of the sidebar.

3 Claims, 7 Drawing Figures

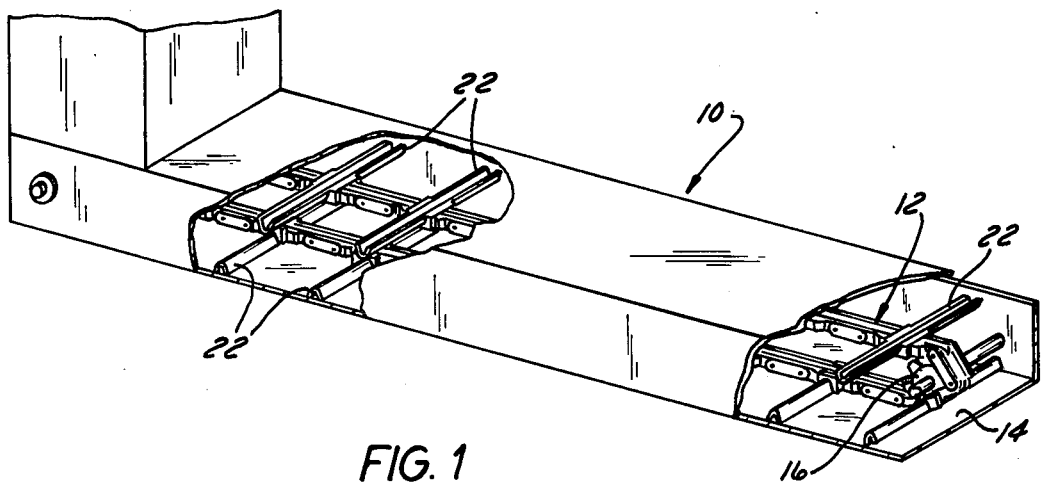
FIG. 1
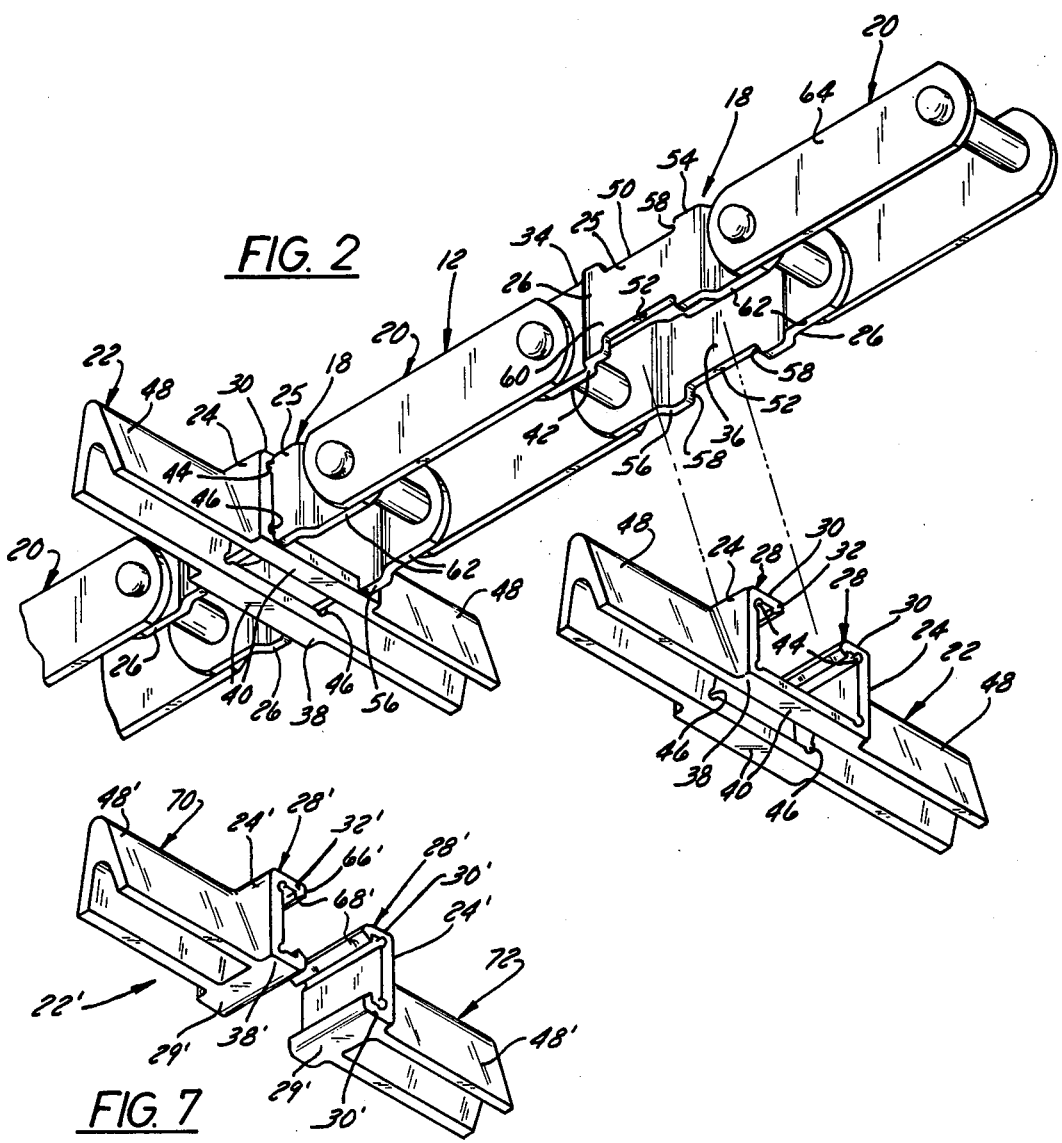
FIG. 2
FIG. 7

TWO-PIECE SNAP-ON FLIGHT FOR A CONVEYOR CHAIN

BACKGROUND OF THE INVENTION

This invention relates to a flight for a chain, and, more particularly, to a flight including integral means for attachment to a chain link.

This invention arose out of the need for a chain to convey pellet-like bulk material, such as kernel corn, wheat, barley, ground coffee, and so forth, where preservation of the edible quality of the material is an important concern in its handling techniques. The edible quality of the material would be damaged if contaminating lubricants were used in the conveying equipment or if there were turbulence in the grain during the conveying process, tending to break up the grains and cause dust.

Previous chains used for this purpose provide flights having wedge-shaped or inverted V-shaped cross-sections, designed to directly push the material to be moved. The flights are made of metal and are either bolted to the chain, welded to the chain or cast as an integral part of the chain links.

In conveying bulk material, it may be desirable to change the configuration or spacing of the flights to match their dynamic characteristics with the density, moisture content, and flow characteristics of various bulk materials. In the case of flights which are cast as an integral part of the chain link or which are welded to the link, it is impossible to interchange flights or to change the spacing between flights without disassembling the links. In the case of flights which are bolted onto the links, it is generally required that the links have tabs or some kind of projections onto which the flights can be bolted. This means that the spacing of flights cannot be changed without disassembling the chain unless there are many links on the chain with the necessary tabs. Chains with large numbers of tabbed links are cumbersome and expensive. The excess number of tabs would also tend to adversely affect the flow characteristics of the bulk material, as the material would catch on the exposed tabs.

Metal flights are heavy and produce a substantial amount of friction and wear when sliding on the bottom of the bin. Lubricants generally cannot be used where they would come in contact with grains or other foodstuffs, so much energy is required to overcome the friction and drive the chain.

If there is blockage in the bin putting excess force on the metal flights, it is possible to damage not only the flights but also the chain, bin, sprocket, and other parts of the system.

The use of resilient polymeric links and polymeric parts of links is known in the chain art. However, polymeric pusher flights have not been used before. U.S. Pat. No. 4,096,943 "Gentsch" and U.S. Pat. No. 3,842,968 "Owens", both of which are hereby incorporated by reference, show snap-on attachments for chain links. Both Gentsch and Owens disclose a top plate which may be snapped onto a roller chain to form a conveyor chain which carries articles on its top surface. Both top plates are made of a polymeric material and both top plates have two spaced-apart legs which may be flexed in order to be separated and to be mounted on the outside of a chain link. The Gentsch top plate has indentations in the legs to accept an extended chain pin so as to attach the top plate to the chain. The Owens attachment has legs which contact the upper and lower edges of the sidebars of the chain and the outer surface of the sidebars in order to attach the top plate to the chain.

The attachments in the Gentsch and Owens patents are not intended to withstand substantial forces tending to pull the attachment off of the chain. The attachments of Gentsch and Owens will not experience a substantial force relative to the chain during normal operation, because the vertical load of the conveyed articles is taken by rails which are part of the conveyor. These attachments were not meant to sustain the stresses which are encountered by a flight which pushes bulk material.

SUMMARY OF THE INVENTION

One object of the present invention is to provide flights which may be easily attached to and detached from the chain links. The object is attained in a flight constructed in accordance with the invention which includes a side portion adapted to lie against the outer surface of a sidebar of the chain link. A lip is attached to the side portion and includes a portion which is adapted to contact the inner surface of the sidebar, so as to attach the flight to the chain link. This allows the user to adjust the spacing of the flights according to the needs of the material to be moved, as well as permitting the user to change the configuration of the flights on the chain simply by replacing one set of flights with another.

Another object of the present invention is to provide flights which, when faced with excessive stress, will tend to deform and fall off of the chain links, thereby avoiding damage to the links and to the rest of the conveyor.

BRIEF DESCRIPTION OF THE DRAWINGS

FIG. 1 is a perspective view of a bin partially cut away to show a chain of the present invention.

FIG. 2 is a broken-away perspective view of the chain shown in FIG. 1, including a first embodiment of the flight attachment, and showing one flight removed from the chain.

FIG. 7 is a perspective view of a second embodiment of a flight made in accordance with the present invention.

DESCRIPTION OF THE PREFERRED EMBODIMENTS

Figure 5:
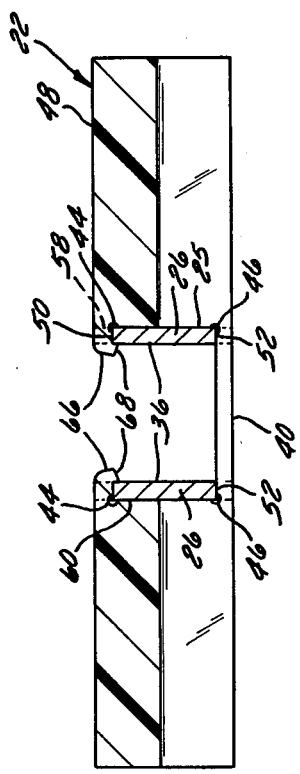
FIG. 5 is a sectional view taken along the section 5—5 of FIG. 4.
Figure 6:
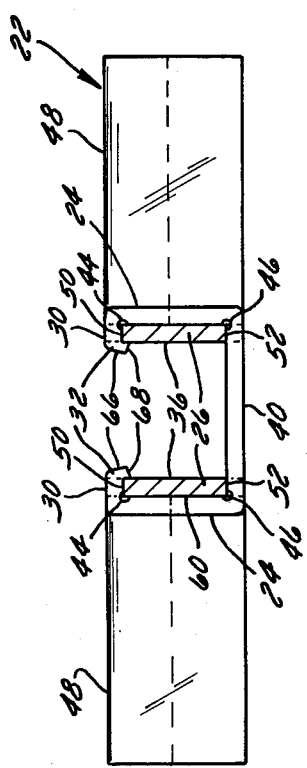
FIG. 6 is a sectional view taken along the section 6—6 of FIG. 4.

Referring now to FIG. 1, bulk material (not shown) is transported through a bin 10 by a chain 12 located inside the bin 10. The chain 12 rests on the bottom 14 of the bin 10 and is driven along the bottom of the bin 10 by sprockets 16. The chain 12 returns along the top of the bin 10 as shown, although the return leg could run beneath the bottom of the bin 10.

In FIG. 2, it can be seen that chain 12 is made up of alternating center links 18 and pin links 20. A flight 22 is attached to each of the center links 18. Alternatively, flights 22 could be attached to pin links 20, or to both center and pin links 18 and 20.

Each flight 22 is made up of a pair of side portions 24 which lie against the outer surfaces 25 of the sidebars 26 of the center link 18. Lips 28 are integrally attached to the side portions 24 at one end. The lips 28 include a horizontal portion 30 and a vertical portion 32. The horizontal portion 30 is in contact with the top edge 34 of sidebar 26, and the vertical portion 32 engages the inner surface 36 of the sidebar 26. The ends 38 of the side portions 24 opposite the lips 28 are connected by two cross members 40. The cross members 40 contact the bottom edge 42 of sidebars 26. There are grooves 44 along the inner surface of the flight 22 along the intersection of the side portions 24 with the horizontal portions 30. There are also grooves 46 along the inner surface of the flight 22 at the intersection of the cross members 40 with the side portions 24. The function of the grooves 44, 46 is two-fold. First, the grooves 44, 46 permit flexibility of the lips 28 relative to the side portions 24 and of the side portions 24 relative to the cross members 40. Second, the grooves 44, 46 provide a space between the flight 22 and the sidebar 26 in an area where there may be burrs along the sidebar 26 which would tend to cut the flight 22 if they came into direct contact with it.

Arms 48 project laterally outwardly from the side portions 24. The arms 48 have an inverted V-shaped cross-section, which can be seen most clearly in FIG. 4. The angle of the V-shaped cross-section and the height of the arm 48 may vary depending upon the type of material to be pushed by the arm 48. The fact that the arm 48 has a V-shaped cross-section rather than a solid wedge-shaped cross-section means that the surface of arm 48 which contacts the bottom 14 of the bin 10 is reduced, so as to reduce friction force.

Figure 4:
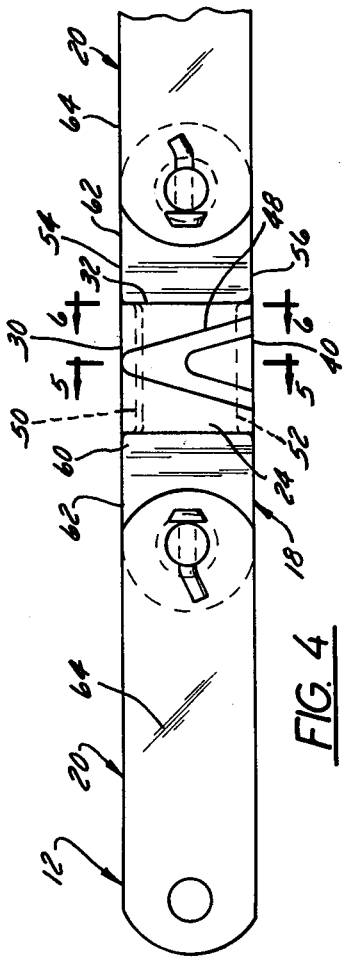
FIG. 4 is a broken-away side view of the chain and flight of FIG. 1.

Looking more closely at the center link 18 on which the flight 22 is mounted, it should be noted that the top edges 34 and the bottom edges 42 of the sidebars 26 have recesses 50, 52 in their central portions 60 into which the horizontal portion 30 and the cross members 40 fit. The recesses 50, 52 serve two main functions. First, they permit flight 22 to be approximately flush with the top and bottom surfaces 54, 56 of the sidebars 26 (as best seen in FIG. 4) so as to present a smooth outer surface to the bulk material to be moved, thereby reducing turbulence and dust. Second, the ends 58 of recesses 50, 52 tend to prevent the flight 22 from slipping along the length of the sidebars 26.

Figure 3:
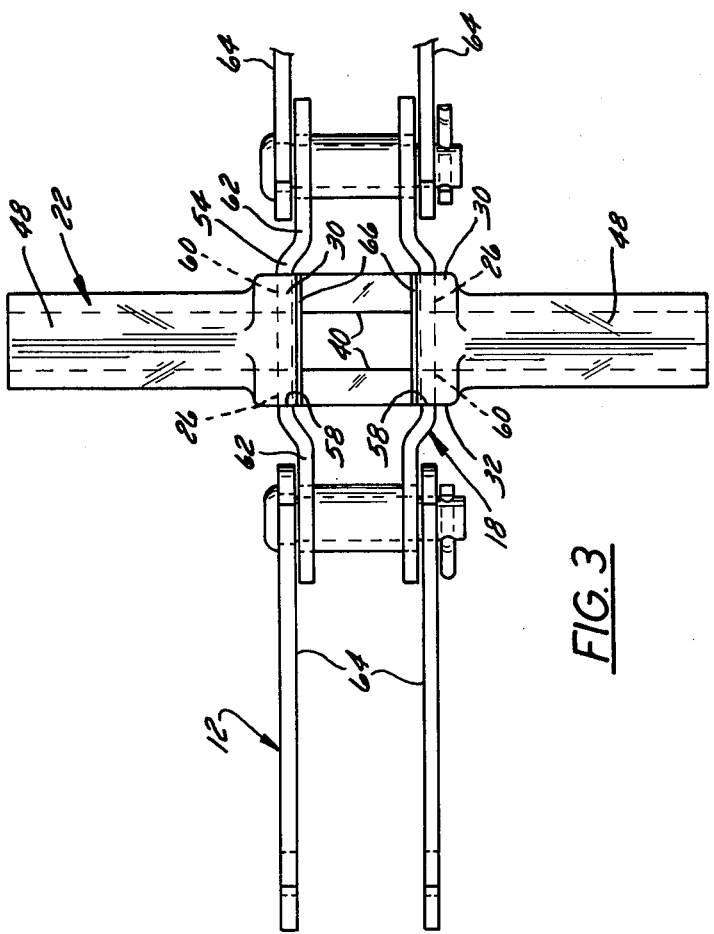
FIG. 3 is a broken-away top view of the chain and flight of FIG. 1.

Another feature of center link 18 is that it has a double offset, which can be best seen in FIG. 3. That is, the central portion 60 of each sidebar 26 is offset outwardly from the ends 62 of the sidebar 26. This double offset feature provides several advantages. First, the central portion 60 is aligned with the straight sidebar 64 of pin link 20. The alignment of the links 18, 20 presents a smooth outer surface to the bulk material to be moved, which again reduces turbulence and dust. The fact that the central portion 60 and the sidebar 64 are aligned means that the flights 22 may be installed on either center link 18 or pin link 20 or both, provided that the sidebars 64 have recesses similar to the recesses 50, 52 shown in the central portion 60. Therefore, great flexibility in the placement of flights 22 along the chain 12 is permitted. The double offset also means that the gap between sidebars 26 is large enough to permit standard sprockets to be used; there is not a narrow gap which would require the use of special sprockets or other special measures. Another advantage of the double offset is that it gives the flight 22 a wide stance for greater stability. The double offset also provides protection for the vertical portions 32 of the flights 22, because the ends 62 of the sidebar 26 guide the sprocket teeth away from the vertical portion 32.

In order to mount the flight 22 onto the link 26, the lips 28 are spread, and the flight 22 is pushed up onto the center link 18 until the lips 28 wrap around the top edges 34 of the sidebars 26, and the flight 22 snaps into place. It should be noted that the outside surface 66 of the vertical portion 32 is at a slight angle to the vertical, so that, as the flight 22 is pushed onto the center link 18, the outside surface 66 provides a ramp-like surface which causes the lips 28 to continue to separate. The leading edge 68 of the vertical portion 32 is also at a slight angle to the horizontal; in this embodiment the angle is approximately 15°. The slight angle on the leading edge 68 provides a ramp which aids the vertical portion 32 in passing over the top edge 34 of the sidebar 26 as the flight 22 snaps into place. The flight 22 is then held in place by the resilience of lips 28 and of side portions 24.

In order to remove the flight 22 from the link 26, a bending force may be applied to the vertical portions 32 so as to flex vertical portions 32 toward each other and to lift vertical portions 32 until they clear the top edges 34 of the sidebars 26. The side portions 24 are then flexed outwardly away from each other until the outside surfaces 66 of the vertical portions 22 contact the outer surfaces 25 of the sidebars 26. Then, the flight 22 is pulled downward and removed from the link 18.

In normal operation of the chain 12, the major forces tending to move the flight 22 relative to the links 18 on which they are mounted (and thereby tending to remove the flights 22 from the chain 12) are the forces exerted on the arms 48 by the bulk material as it is pushed through the bin 10. The forces exerted by the bulk material are mainly exerted on the arms 48 in a direction opposite to the direction of travel of the chain 12. Therefore, the force at the joint between the flight 22 and the link 18 is in a direction opposite to the direction of travel of the chain and includes a moment, due to the fact that the force which is exerted on the arm is operating at a distance away from the joint between the flight 22 and the link 18.

The force which is opposite to the direction of travel of the chain is primarily supported by the ends 58 of recesses 50, 52 which push against the cross members 40 and horizontal portions 30 of the lips 28. The moment, which tends to twist the arms 48 relative to the sidebars 26, is supported by the vertical portions 32 and side portions 24 which press against the sidebars 26, as well as by the cross members 40.

There is no substantial force, under normal operation of the chain 12, which tends to flex vertical portions 32 toward each other so as to detach the flight 22 from the chain 12. However, if excessive forces are encountered, due, for example, to foreign matter causing blockage in the bin 10, it is expected that the flights 22 will flex in the arms 48 and distort in the area of the cross members 40, side portions 24 and lips 28, until the flight 22 is detached from the link 18.

In selecting the configuration and spacing of flights 22 for conveying a particular bulk material, several factors should be considered. The friction factor between the bulk material and the bottom 14 of the bin 10 affects the amount of force that must be applied to the bulk material in order to move it, and, where the friction factor is high, a greater force may be applied to the bulk material by providing a closer spacing of flights 22 along the chain 12.

The slope, height, width and other characteristics of the flight 22 may be altered, depending upon the density, moisture content, particle size, and other characteristics of the bulk material. Then, in order to change from one flight configuration and spacing to another, the flights that are on the chain 12 are removed and new flights having the new configuration and spacing are mounted onto the chain.

A second embodiment of the invention is shown in FIG. 7. In this embodiment, the flight 22' is made in two parts 70, 72. Each part 70, 72 includes a side portion 24' with lips 28' and 29' integrally attached to the ends of each side portion 24'. An arm 48' extends laterally outwardly from each side portion 24'. The arm 48' has an inverted V-shaped cross-section. The lips 28' are identical to the lips 28 described in earlier figures. The lips 29' are also identical to the lips 28. In order to mount the part 70 on a link, one of the lips, either 28' or 29' is placed over the edge 34 or 42 of the sidebar 26 so that the horizontal portion 30' of the lip 28' or 29' contacts the edge 34 on 42 and the vertical portion 32' of the lip 28' or 29' contacts the inner surface 36. The other lip 29' or 28' is then snapped into place on the remaining edge 42 or 34, with the leading edge 68' and the outside surface 66' again acting as ramps to aid in the assembly process. The other part 72 is mounted on the other sidebar 26 in a similar manner.

The two-piece flight 22' has some practical advantage over the one-piece flight 22 in that it does not have cross members 40 which may tend to catch some of the bulk material. Also, because the parts 70, 72 are not attached to each other, there is no limit to the width of the link on which a single configuration of the two-piece flight 22' may be attached. The two-piece flight 22' may be manufactured less expensively than the one-piece flight 22, because it does not have to meet the close tolerances required in the one-piece flight 22. It is also possible to mount the parts 70, 72 on alternate center and pin links 18, 20, so that there is only one part 70 or 72 of a flight 22' on each link 18, 20. Otherwise, the two-piece flight 22' works and is constructed almost identically to the one-piece flight, except that the cross members 40 are replaced by lips 29' both structurally and functionally.

Another embodiment which has been proposed as a method of solving the problem of material collecting on the cross members 40, is a flight identical to flight 22 except that the cross members 40 are provided with slanting top surfaces which would not be as likely to collect bulk material as would the flat top surfaces. If static charge on the flights is a problem, it is possible to make the flights 22 and 22' of a polymeric material which has a distribution of conductive elements in it, such as carbon black particles, in order to avoid a build-up of static charge on the flights. The flights 22 and 22' may be made of various materials as long as the parts which must flex have the necessary resilience and the flights 22, 22' have the necessary stiffness and strength to support the loads required for pushing the bulk material. While this invention was originally derived for use with bulk foodstuffs, it will be obvious that it may be used with other granular bulk materials as well.

Various modifications to the embodiments shown in these figures have been suggested in this description. It should be obvious to one skilled in the art that the present means for attaching the flight onto the link may be used in conjunction with flights other than a flight having an inverted V-shaped cross-section, and that various other modifications may be made to the embodiments without departing from the scope of the present invention.

What is claimed is:

1. A chain link pusher conveyor assembly, comprising:
   a chain composed of chain links each including a pair of sidebars, each sidebar having inner and outer surfaces and upper and lower edges; and
   a snap-on flight mounted on said link, comprising at least one piece, each piece comprising a resilient side portion lying against the outer surface of one of said sidebars, an arm projecting laterally outwardly from said side portion, and two lips, at least one of which is resilient, one at each end of said side portion, each of said lips comprising a vertical portion which engages the inner surface of the adjacent sidebar and a horizontal portion which engages one of the edges of the sidebar for releasably holding said portion against said outer surface of said sidebar, each piece having a groove along its inner surface at the intersections of side portion with said horizontal portions;
   wherein said piece may be readily detached from said sidebar by exerting a bending force on said piece to release said lips from engagement with said inner surface, and said piece may be securely attached, and remain attached to said sidebar during normal operation, by elastically deforming and snapping said resilient lip into engagement with said inner surface where they are held by the resilience of said resilient lips and said side portion.

2. A chain link pusher conveyor assembly as recited in claim 1, wherein said arm has an inverted V-shaped cross-section.

3. A chain link pusher conveyor assembly as recited in claim 1, wherein each snap-on flight comprises two independent pieces engaging side bars on opposite sides of said chain.

* * * * *